Oct. 13, 1970     F. B. HARLEY     3,533,655

RELEASABLE FASTENERS

Filed March 25, 1968     2 Sheets-Sheet 1

INVENTOR
FRANK B. HARLEY

Oct. 13, 1970     F. B. HARLEY     3,533,655

RELEASABLE FASTENERS

Filed March 25, 1968     2 Sheets-Sheet 2

INVENTOR
FRANK B. HARLEY

United States Patent Office 3,533,655
Patented Oct. 13, 1970

3,533,655
RELEASABLE FASTENERS
Frank Bernard Harley, Egham, England, assignor to Harley Patents (International) Limited, London, England, a company of Great Britain
Filed Mar. 25, 1968, Ser. No. 715,900
Claims priority, application Great Britain, Apr. 4, 1967, 15,315/67
Int. Cl. B64d 17/38
U.S. Cl. 294—83                                                12 Claims

ABSTRACT OF THE DISCLOSURE

This invention relates to releasable fasteners particularly for use at the end of an arm extending out from a helicopter and from which fastener a cable or rope may hang, and down which cargo or troops can be disembarked. The invention, provides such a fastener which includes a body affording a notch, a retaining catch pivotally carried by the body, a locking piece mounted for rectilinear movement in the body between locked and unlocked positions and which in the locked position prevents, directly or indirectly, movement of the retaining catch between closed and open positions, and a safety catch mounted in the body for movement between "safe" and "release" positions in which positions movement of the locking piece to the unlocked position is respectively prevented and permitted.

---

This invention relates to releasable fasteners and is particularly concerned with a fastener of an extremely reliable nature which may, for example, be employed at the end of an arm extending out from a helicopter and from which fastener a cable or rope may hang, and down which cargo or troops can be disembarked. With such arrangement it is essential to have a ready form of release of the rope or cable in case the lower end thereof should become entangled with undergrowth or trees. If such ready release were not available the helicopter would, of course, be tethered. Accordingly, it is essential to provide a ready release but this, in itself, introduces a risk that inadvertent release might occur during descent of cargo or troops and the invention is particularly concerned with the provision of an arrangement for safeguarding against such a hazard.

According to the invention, therefore, a releasable fastener comprises a body affording a notch open at one end to receive another part which is to be secured to the body, a retaining catch pivotally carried by the body and moveable between an open position in which the notch is open, and a closed position in which a limb of the catch bridges the open end of the notch to trap said other part therein, a locking piece mounted for rectilinear movement in the body between locked and unlocked positions and which in the locked position prevents, directly or indirectly, movement of the retaining catch between its closed and open positions, and a safety catch mounted in the body for movement between "safe" and "release" positions in which positions movement of the locking piece to the unlocked position is respectively prevented and permitted.

Preferably the safety catch is mounted for bodily movement with respect to the body. The safety match may include abutment means to co-operate with location means on the body to retain the safety catch in the safe position and preferably the abutment means is duplicated to provide a further safety measure. The abutment means may, for example, comprise a pair of levers pivotally mounted with respect to the remainder of the safety catch and spring biassed into engagement with the location means.

According to a particular arrangement an intermediate lever is provided between the locking piece and the retaining catch and the arrangement is such that a load when applied to the retaining catch is transmitted to the body via the intermediate lever rather than to the locking piece so as not to hinder movement of the locking piece between the locked and unlocked positions. With such an arrangement the locking piece and intermediate lever are provided with abutment surfaces which normally prevent movement of the intermediate lever to a position in which the retaining catch can move to an open position until the locking piece is moved to the unlocked position.

Preferably a single spring is provided which biasses the retaining catch to the open position and the locking piece to the locked position. The invention may be carried into practice in a number of ways but two specific embodiments will now be described by way of example with reference to the accompanying drawings in which.

Figure 1:
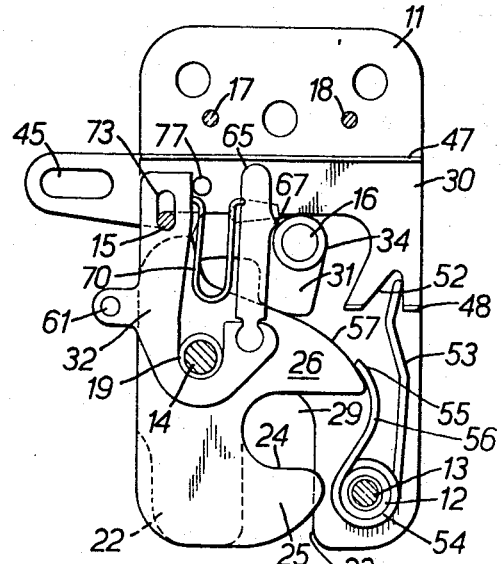
FIG. 1 is a sectional side elevation of one form of releaseable fastener according to the invention, on the line 1—1 of FIG. 2.

The fastener shown in FIGS. 1 to 4 comprises a pair of spaced side plates 10 held apart at their upper ends by a spacer block 11 and at a lower region by a sleeve 12 through which passes a rivet 13. Other rivets 14, 15, 16, 17 and 18 also extend between the side plates 10 and, apart from securing the side plates firmly together, also serve for other purposes, as will appear.

Surrounding the rivet 14 is a further spacer sleeve 19 upon which is pivoted a retaining catch or hook 22. It will be seen that at their lower ends the two side plates 10 have aligned open-ended slots 23, and the hook 22 has an open-ended slot or jaw 24 formed by spaced limbs 25 and 26. In the closed positions of FIGS. 1, 2 and 3 it will be seen that the limb 25 extends at right angles to the open-ended slots 23 so that a D-ring, a loop of cable, a chain or other part may be trapped in an aperture 29 but may be released therefrom when the hook 22 is pivoted to the open position of FIG. 4. When the hook is free to pivot it will be appreciated that a load, which may be applied for example by cargo secured to the D-ring or other part connected to the fastener, can draw the hook to the open position of FIG. 4 automatically. It is to be noted from FIG. 4 that in the open position the limb 26 of the jaw extends into the open-ended slots 23 whereby insertion of a D-ring or other part into the slots can allow pressure to be applied to the jaw to move it anti-clockwise to the closed position in which it can be automatically locked in a manner to be described.

Figure 3:
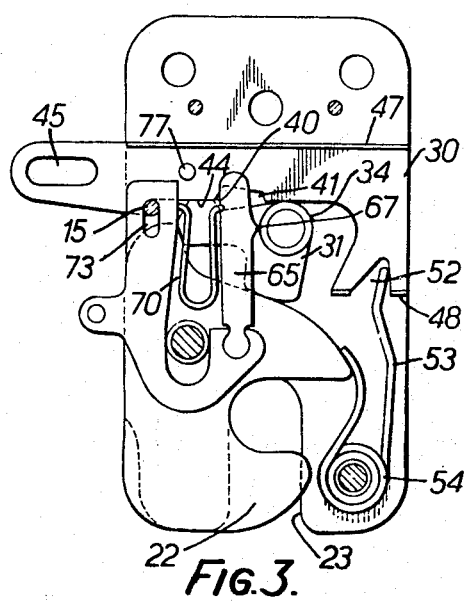
FIG. 3 is a view similar to FIG. 1 but showing the safety catch in the "release position"

Thus to retain the hook 22 in the closed position a number of other parts are provided which comprise a locking piece 30, an intermediate lever 31 and a safety catch 32. The intermediate lever 31 is mounted to rotate on a sleeve 34 surrounding the rivet 16 and has one arm 35 formed with a pair of plane end surfaces 36 and 37 respectively arranged to co-operate with a surface 38 on the hook 22 and one end 40 of a notch 41 formed on the underside of the locking piece 30. As shown in FIGS. 1 and 3 in the closed position of the hook 22 the surface 36 of the intermediate lever 31 is engaging the surface 38 of the hook to prevent clockwise rotation thereof to the open position. In the open position of FIG. 4, however, the arm 35 has rotated upwards clear of the hook 22 due to the fact that the intermediate lever 31 has rotated clockwise to a small extent so that the upper side of the arm 35 of the intermediate lever projects into the notch 41.

Figure 4:
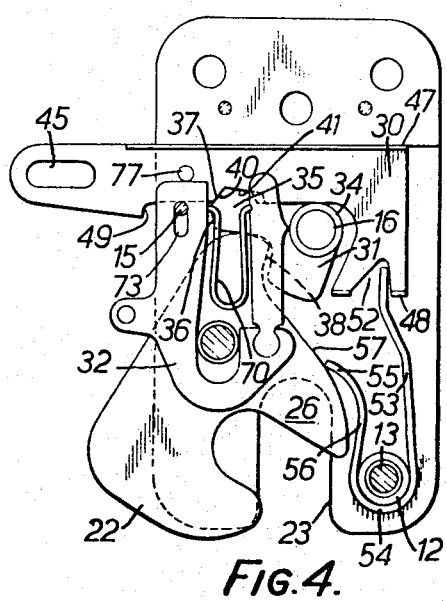
FIG. 4 is a further view similar to FIGS. 1 and 3 showing the locking piece moved to its unlocked position.

It will be appreciated from a comparison of FIGS. 1 and 3 on the one hand and FIGS. 1 and 4 on the other hand that this rotation of the intermediate lever 31 can only occur when the locking piece 30 has been moved in a rectilinear manner to the left in these figures since, in the position of FIGS. 1 and 3, clockwise rotation of the intermediate lever 31 is prevented by the locking piece engaging on the under surface 44 of the locking piece. The locking piece can be drawn to the unlocked position of FIG. 4, for example by means of a cable connected to a slot 45 formed in the end thereof.

Figure 2:
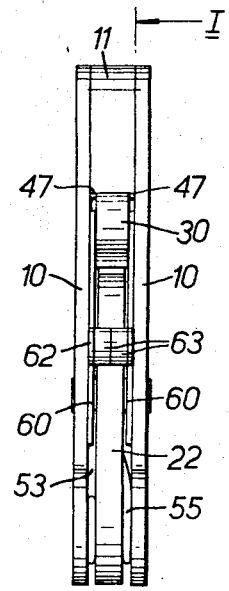
FIG. 2 is an end elevation of the fastener of FIG. 1.

As can be seen from FIG. 2 each of the parts 22, 31 and 30 is of a thickness which is less than the spacing between the two side plates 10. The reason for this will be clear when the safety catch 32 is fully described but it is to be noted that due to this feature the locking piece 30 is provided along its upper edge with a flange 47 on each side and similar small flanges 48 at its lower right-hand end, the outer faces of these flanges bearing against the inner faces of the side plates 10 so that the locking piece 30 is securely located laterally for the rectilinear movement it has to carry out. The upper face of the locking piece 30 bears against the underside of the spacer block 11 and the locking piece is further located for its rectilinear movement by means of the sleeve 34 surrounding the rivet 16, and also by the rivet 15. As is most clearly seen in FIG. 4, the locking piece 30 has a shoulder 49 which can abut the rivet 15 in the locked position to prevent further movement to the right in FIGS. 1, 3 or 4.

Between the two pairs of flanges 48 formed at the lower right hand end of the locking piece 30 is a recess 52 which receives the upper end of one arm 53 of a coil spring 54 which surrounds the sleeve 12. The other end 55 of a further arm 56 of the coil spring bears against a curved upper surface 57 of the hook 22 so that stress in the spring tends to cause movement of the hook 22 to the open position, and consequent anti-clockwise rotation of the lever 31, and also movement of the locking piece 30 to the right to the locked position. The spring thus has a three-fold function.

Figure 5:
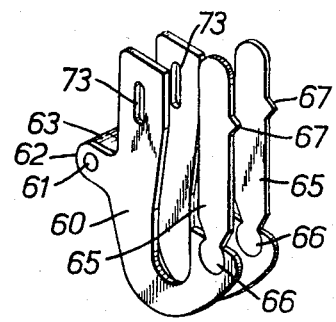
FIG. 5 is an enlarged perspective view of the safety catch.

Turning now to the safety catch 32, and in particular to FIG. 5, it will be seen that this catch is formed by two spaced members 60 each of generally J formation and secured together by a rivet 61 extending between projecting lugs 62 between which are placed a pair of small spacer blocks 63. Thus the two members 60 are formed as one unit and they are spaced apart so as to be capable of upward and downward sliding movement in the space provided on each side of the hook 22, the intermediate lever 31 and locking piece 30. Referring to FIG. 2 the members 60 are seen in end elevation. The safety catch is completed by a pair of detents 65 each of which at its lower end has a generally circular portion 66 located in a circular opening in the appropriate member 60 to permit slight rotational movement of the detents with respect to the member 60. One side of each of the detents is provided with a generally triangular projection 67. Referring to FIGS. 1, 3 and 4, a pair of U shaped springs 70 are located between the members 60 and the detents 65 in order to bias the detents 65 clockwise in these figures so that the triangular projections 67 bear upon the sleeve 34 surrounding the rivet 16. In FIG. 1 it will be seen that the projections 67 have been biased by the spring 70 to a position in which they lie against the outer surface of the sleeve 34 at a level above a horizontal plane extending through the axis of this sleeve. Accordingly, the safety catch is located firmly in this upper position with the rivet 15 lying in the lower end of a slot 73 in the long arm of each member 60. Downward movement of the safety catch by finger application to the pair of spacer blocks 63 can cause the detents 65 to be biased anti-clockwise so that the projections 67 ride over the surface of the sleeve 34, rotation of the detents at this time taking place by movement of the circular portions 66 in the circular openings of the members 60.

The downward movement of the safety catch 32 is limited by engagement of the rivet 15 with the upper end of the slot 75 and the catch is guided during its movement by the two members 60 sliding rectilinearly along the sleeve 19.

Operation of this device is accordingly as follows: Assuming first that it is in the position of FIG. 4 with the hook 22 in the open position, the safety catch 32 in its lower "release position," and the locking piece 30 in its unlocked position, the insertion of say a D-ring into the open-ended slits 23 of the side plates 10 will enable the D-ring to engage the limb 26 of the hook 22 to bias this anti-clockwise to the position of FIGS. 1 and 3. During such anti-clockwise rotation of the hook 22 the intermediate lever 31 will be prevented from rotation anti-clockwise until its surface 36 can move down adjacent the surface 38 of the hook 22. As soon as the hook 22 reaches the FIG. 3 position the intermediate lever 31 can, of course, be rotated by the locking piece and accordingly move clear of the notch 41 whereafter the spring 54 will bias the locking piece 30 to the right from the position of FIG. 4 to the position of FIGS. 1 and 3. In order to prevent any indavertent release of the D-ring by the application of a load unintentionally to the locking piece 30 the safety catch 32 will then be moved upwards from its position of FIGS. 3 and 4 to the position of FIG. 1 at which time the locking piece will be incapable of movement to the left due to the fact that the upper ends of the members 60 of the safety catch block movement of pins 77, extending outwards from each side of the locking piece 30.

Figure 6:
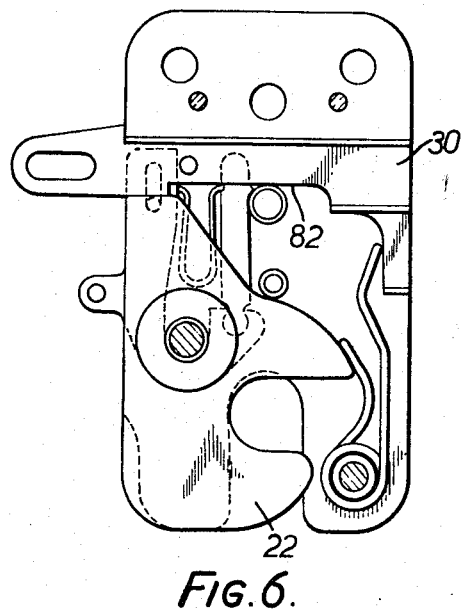
FIGS. 6 and 7 are views of an alternative form of fastener.
Figure 7:
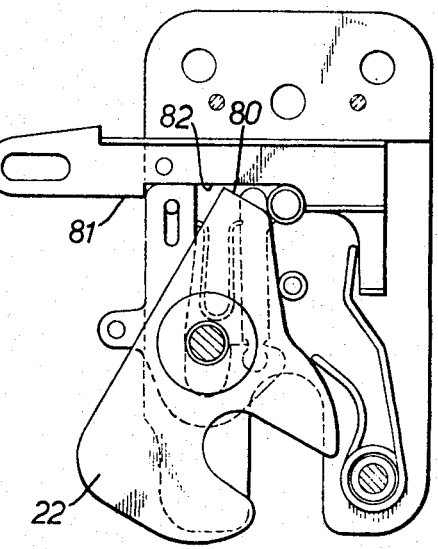

The second embodiment shown in FIGS. 6 and 7 differs in principle from the first only in that the intermediate lever 31 is omitted so that the second embodiment the locking piece 30 co-acts directly with the hook 22. Thus, as can be seen in FIG. 7, a flat surface 80 is provided on the top of the hook 22 which in the locked position of FIG. 6 abuts against the underside 81 of the locking piece 30. In the unlocked position of FIG. 7, however, with the locking piece 30 drawn outwards, a recess 82 on the underside of the locking piece permits rotation of the hook 22 to the open position. The safety catch in the embodiment of FIGS. 6 and 7 is precisely the same as that in FIGS. 3 and 4 and will, therefore, not be described again.

The essential difference between the two embodiments i.e. the inclusion of the intermediate lever 31 in the first embodiment enables, in the first embodiment, ready movement of the locking piece 30 even if a considerable load is being applied to the hook 22 since this load is transmitted via the surface 36 to the intermediate lever and thence via the sleeve 34 to the rivet 16 so that the load does not hinder movement of the locking piece 30. Where the load on the hook is likely to be light the intermediate lever can be omitted as in FIGS. 6 and 7 and the load is then transmited from the hook 22 via the surfaces 80 and 81 and if this frictional contact is not too great this will not seriously hinder movement of the locking piece 30 to the "release position." The precise form of the locking piece 30 in FIGS. 6 and 7 differs slightly from that of FIGS. 1 to 4 but the differences are not of particular significance as far as the invention is concerned.

What I claim as my invention and desire to secure by Letters Patent is:

1. A releasable fastener having a body comprising a pair of plates, spacing means maintaining opposed surfaces of said plates in spaced apart substantially parallel relationship, said plates defining a notch extending through said plates which is open at one end to receive another part which is to be secured to the body, a retaining catch pivotally mounted on the body between said plates, said retaining catch being movable between an open position in which the notch is open and a closed position in which a limb of the retaining catch bridges the open end of the notch to trap said other part therein, a locking piece mounted for rectilinear movement between the plates between "locked" and "unlocked" positions and which in the "locked" position prevents movement of the retaining catch between its closed and open positions, and a safety catch mounted between the plates for movement in a direction generally at right angles to said rectilinear movement of the locking piece between "safe" and "release" positions in which movement of the locking piece to the "unlocked" position is respectively prevented and permitted.

2. A releasable fastener as claimed in claim 1 in which the locking piece has side surfaces facing but separated from the said opposed surfaces of the plates thereby to form spaces between the plates and the locking piece, guiding portions extending laterally from the side surfaces of the locking piece for sliding engagement with the said opposed surfaces, stop means extending laterally from said side surfaces towards said opposed surfaces, a safety catch having two spaced stop sections extending one into each of the said spaces and said stop means engaging the stop sections in the said "safe" position to prevent movement of the locking piece to the "unlocked" position.

3. A releasable fastener as claimed in claim 1 including a number of transverse spacers extending between the side plates at least two of which serve to guide the safety catch during its movement between "safe" and "release" positions.

4. A releasable fastener as claimed in claim 1 including a number of transverse spacers extending between the side plates one of the spacers serving to guide both the locking piece and the safety catch.

5. A releasable fastener as claimed in claim 1 in which the safety catch includes abutment means to co-operate with location means on the body to retain the safety catch in the "safe" position.

6. A releasable fastener as claimed in claim 5 in which the abutment means is duplicated.

7. A releasable fastener as claimed in claim 6 in which the abutment means comprises a pair of levers pivotally mounted with respect to the remainder of the safety catch and spring biassed into engagement with the location means.

8. A releasable fastener as claimed in claim 1 including an intermediate lever between the locking piece and the retaining catch, the arrangement being such that a load, when applied to the retaining catch in its closed position is transmitted to the body via the intermediate lever.

9. A releasable fastener as claimed in claim 8 in which the locking piece and intermediate lever are provided with abutment surfaces which normally prevent movement of the intermediate lever to a position in which the retaining catch can move to an open position until the locking piece is moved to the unlocked position.

10. A releasable fastener as claimed in claim 1 including a number of transverse spacers extending between the side plates at least two of which serve to guide the locking piece during its rectilinear movement.

11. A releasable fastener as claimed in claim 10 in which one of the transverse spacers acts as a location means to retain the safety catch in the "safe" position.

12. A releasable fastener comprising a body formed by a pair of spaced plates, the plates affording aligned notches each open at one end to receive another part which is to be secured to the body, a retaining catch pivotally carried by the body between the plates and movable between an open position in which the notch is open, and a closed position in which a limb of the catch bridges the open end of the notch to trap said other part therein, a locking piece mounted between the plates for rectilinear movement between locked and unlocked positions, the locking piece in the locked position being arranged to prevent movement of the retaining catch between its closed and open positions, and a safety catch mounted between the plates for movement in a rectilinear direction between "safe" and "release" positions in which positions movement of the locking piece to the unlocked position is respectively prevented and permitted, the locking piece and safety catch being located for movement by transverse spacer means extending between the plates, at least two of such spacer means cooperating with each of said locking piece and safety catch.

References Cited

UNITED STATES PATENTS

| 2,547,313 | 4/1951 | Gosser | 294—83 |
| 3,224,803 | 12/1965 | Elsner et al. | 294—83 |
| 3,405,966 | 10/1968 | Harley | 294—83 |
| 3,405,967 | 10/1968 | Harley | 294—83 |

ANDRES H. NIELSEN, Primary Examiner